(12) United States Patent
Abdul et al.

(10) Patent No.: US 8,381,014 B2
(45) Date of Patent: Feb. 19, 2013

(54) NODE CONTROLLER FIRST FAILURE ERROR MANAGEMENT FOR A DISTRIBUTED SYSTEM

(75) Inventors: Anis M. Abdul, Austin, TX (US); Ajay K. Mahajan, Austin, TX (US); Nicholas A. Pietraniec, Austin, TX (US); Andrea Y. Ma, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 184 days.

(21) Appl. No.: 12/775,195

(22) Filed: May 6, 2010

(65) Prior Publication Data

US 2011/0276822 A1  Nov. 10, 2011

(51) Int. Cl.
*G06F 11/34* (2006.01)
*G06F 11/00* (2006.01)

(52) U.S. Cl. ............. 714/4.1; 714/11; 714/47.1; 714/57
(58) Field of Classification Search .................... 714/4.1, 714/4.5, 4.11, 11, 20, 38.1, 38.14, 47.1, 48, 714/57; 709/223, 224
See application file for complete search history.

(56) References Cited

U.S. PATENT DOCUMENTS

| | | | |
|---|---|---|---|
| 5,432,781 A * | 7/1995 | Nimon | 370/427 |
| 7,111,197 B2 | 9/2006 | Kingsbury | |
| 7,146,523 B2 | 12/2006 | Allen | |
| 7,308,609 B2 | 12/2007 | Dickenson | |
| 7,418,635 B2 | 8/2008 | Schulstad | |
| 2002/0069340 A1 | 6/2002 | Tindal | |
| 2002/0152421 A1 * | 10/2002 | Drogichen et al. | 714/11 |
| 2003/0037288 A1 * | 2/2003 | Harper et al. | 714/37 |
| 2005/0053057 A1 * | 3/2005 | Deneroff et al. | 370/360 |
| 2009/0070639 A1 * | 3/2009 | Langford et al. | 714/57 |
| 2011/0231697 A1 * | 9/2011 | Berke et al. | 714/48 |

FOREIGN PATENT DOCUMENTS

WO  2008/004149 A2  1/2008

OTHER PUBLICATIONS

IBM—"Enhanced First Failure Data Capture", IPCOM000156870D (published Aug. 8, 2007).
Sun—"First Failure Data Capture in Embedded System", IEEE EIT Proceedings 2007 (Jan. 2007).

(Continued)

*Primary Examiner* — Joseph D Manoskey
(74) *Attorney, Agent, or Firm* — David Mims; Mark P Kahler

(57) ABSTRACT

A distributed system provides error handling wherein the system includes multiple nodes, each node being coupled to multiple node controllers for control redundancy. Multiple system controllers couple to the node controllers via a network bus. A particular node controller may detect an error of that particular node controller. The particular node controller may store error information relating to the detected error in respective nonvolatile memory stores in the system controllers and node controllers according to a particular priority order. In accordance with the particular priority order, for example, the particular node controller may first attempt to store the error information to a primary system controller memory store, then to a secondary system controller memory store, and then to sibling and non-sibling node controller memory stores. The primary system controller organizes available error information for use by system administrators and other resources of the distributed system.

20 Claims, 5 Drawing Sheets

OTHER PUBLICATIONS

Demetrescu—"Oracles for Distances Avoiding a Node or Link Failure", SIAM Journal on Computing, ISSN 0097-5397—2008, vol. 37, No. 5, pp. 1299-1318—20 pages—article 27 ref., (Jun. 4, 2008).

Francalanza—"A Theory of System Behaviour in the Presence of Node and Link Failure", Information and Computation, vol. 206 Issue 6, (Jun. 1, 2008).

Ho—"Architecture Validation for Processors", ISCA '95 Proceedings of the 22nd Annual International Symposium on Computer Architecture, (Jun. 1995).

Leonard—"On Lifetime-Based Node Failure and Stochastic Resilience of Decentralized Peer-to-Peer Networks", IEEE/ACM Transactions on Networking, vol. 15, No. 5 (Oct. 2007).

* cited by examiner

DISTRIBUTED SYSTEM

FLASH MEMORY FIRST FAILURE DATA
CAPTURE (FFDC) INFORMATION

FIRST FAILURE DATA CAPTURE (FFDC) RETRIEVAL FROM FLASH METHOD AND TOOL

US 8,381,014 B2

NODE CONTROLLER FIRST FAILURE ERROR MANAGEMENT FOR A DISTRIBUTED SYSTEM

BACKGROUND

The disclosures herein relate generally to information handling systems (IHSs), and more specifically, to management of resource failures in an IHS.

Information handling systems (IHSs) include operating systems that execute many useful resources, such as applications and processes. Upon failure of a particular application or process, an IHS may seek recovery from that failure. Process failures, and other events, may also result in node or node controller failures of the IHS. In response to such failures, an IHS, such as an IHS in a distributed system may seek to store error information that provides useful information regarding the failure. Automated processes of the distributed system, system administrators, or other entities may use the error information for recovery operations or other uses. A distributed system exhibits high efficiency if error information from a failing resource, such as a node controller, is available quickly and requires little or no intervention from a user or other entities.

BRIEF SUMMARY

In one embodiment, the disclosed method of error handling includes providing a plurality of node information handling systems (IHSs) in a distributed system. A respective plurality of node controller IHSs coupled to each of the node IHSs to provide control redundancy. A plurality of system controller IHSs coupled to the plurality of node controller IHSs via a network bus. The method includes detecting, by a particular node controller IHS of the plurality of node controllers, an error of the particular node controller IHS, thus providing a detected node controller error. The method also includes storing, by the particular node controller IHS, error information relating to the detected node controller error in respective nonvolatile memory stores in the system controller IHSs and node controller IHSs according to a first priority order. In one embodiment, the particular node controller IHS includes a node manager that controls the storing of error information according to the first priority order.

In another embodiment, a distributed system includes a plurality of node information handling systems (IHSs), each of the node IHSs having a respective plurality of node controller IHSs coupled thereto to provide control redundancy, each node controller IHS including a respective nonvolatile memory store. The distributed system also includes a plurality of system controller IHSs coupled to the node controller IHSs via a network bus, each system controller IHS including a respective nonvolatile memory store. A particular node controller IHS is configured to detect an error of the particular node controller IHS, thus providing a detected node controller error. The particular node controller IHS is further configured to store error information relating to the detected node controller error in the respective nonvolatile memory stores in the system controller IHSs and node controller IHSs according to a first priority order. In one embodiment, the particular node controller IHS includes a node manager to control the storing of error information according to the first priority order.

In yet another embodiment, a computer program product includes a computer readable storage medium for use on a distributed system that includes a plurality of node information handling systems (IHSs), each of the node IHSs having a respective plurality of node controller IHSs coupled thereto to provide control redundancy, each node controller IHS including a respective nonvolatile memory store, and a plurality of system controller IHSs coupled to the node controller IHSs via a network bus, each system controller IHS including a respective nonvolatile memory store. The computer program product also includes first node manager instructions that instruct a particular node controller IHS of the plurality of node controllers to detect an error of the particular node controller IHS, thus providing a detected node controller error. The computer program product further includes second node manager instructions that instruct the particular node controller IHS to store error information relating to the detected node controller error in respective nonvolatile memory stores in the system controller IHSs and node controller IHSs according to a first priority order. The first and second instructions are stored on the computer readable storage medium. In one embodiment, according to the first priority order, the second node manager instructions instruct the particular node controller IHS to attempt to store the error information first in a primary system controller IHS, second in a secondary system controller IHS, third in a sibling node controller IHS and fourth in a non-sibling node controller IHS.

BRIEF DESCRIPTION OF THE DRAWINGS

The appended drawings illustrate only exemplary embodiments of the invention and therefore do not limit its scope because the inventive concepts lend themselves to other equally effective embodiments.

DETAILED DESCRIPTION

Information handling systems (IHSs) typically employ operating system software that controls hardware and software aspects of a system. A distributed system may include multiple IHSs, such as service processors, that work collectively and separately to manage multiple applications and other aspects of the distributed system. The service processors of the distributed system may include node controllers or node controller IHSs that employ applications and processes that manage nodes or node IHSs of the distributed system. The service processors of the distributed system may also include system controllers or system controller IHSs that manage node controllers and other IHSs of the distributed system.

During normal operation within a distributed system, a particular node controller may detect an error. That error may include many different types of failures, such as communication failure errors, application or process failure errors, crashes or locking up of a particular node or node controller operation, as well as other errors. When a node controller detects an error in a distributed system, resources of the distributed system attempt to store error information relevant to that failure or error for later retrieval. The distributed system monitors processes, applications, and other resources with a high priority on keeping those resources available to the user and other entities at all times. The distributed system may employ one or more system controllers that monitor operations of the node controllers and other devices of the distributed system and manage node controller error information. When a node controller detects an error, that error may cause communication failures within the distributed system. Communication errors may present a challenge to system controllers in retrieving node controller error detection failure information.

In one embodiment of the disclosed failure data node manager methodology, service processors, such as node controllers and system controllers of a distributed system employ node error detection and failure software that provides a method of error storage and retrieval. The method includes using available memory stores within each service processor of the distributed system to store node controller error information for later retrieval. In this manner, system controllers improve their node controller error management capabilities by using multiple locations for storage and retrieval of node controller error information. If a node controller loses communication with a particular system controller, that system controller may later retrieve node controller error information from a different location within the distributed system.

Figure 1:
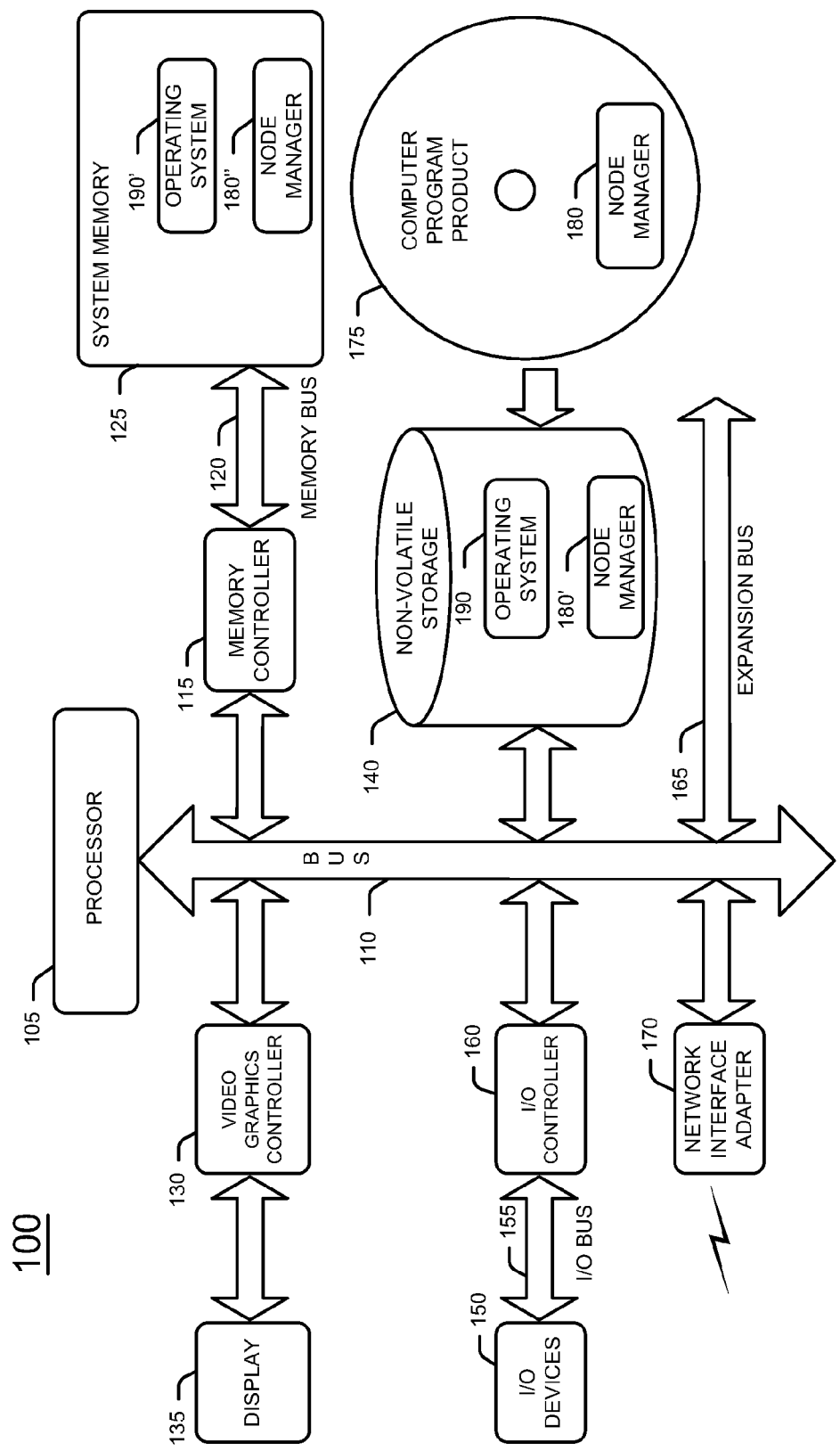
FIG. 1 shows a block diagram of a representative information handling system (IHS) that employs the disclosed failure data node manager methodology.

FIG. 1 shows an information handling system 100 with node manager software 180 that practices the disclosed failure data node manager methodology. IHS 100 may be used as the node controller IHSs and system controller IHSs discussed below with reference to FIG. 2. IHS 100 includes a processor 105 that may include multiple cores. IHS 100 processes, transfers, communicates, modifies, stores, or otherwise handles information in digital form, analog form or other form. IHS 100 includes a bus 110 that couples processor 105 to system memory 125 via a memory controller 115 and memory bus 120. In one embodiment, system memory 125 is external to processor 105. System memory 125 may be a static random access memory (SRAM) array or a dynamic random access memory (DRAM) array. Processor 105 may also include local memory (not shown) such as L1 and L2 caches (not shown). A video graphics controller 130 couples display 135 to bus 110. Nonvolatile storage 140, such as a hard disk drive, CD drive, DVD drive, or other nonvolatile storage couples to bus 110 to provide IHS 100 with permanent storage of information. I/O devices 150, such as a keyboard and a mouse pointing device, couple to bus 110 via I/O controller 160 and I/O bus 155.

One or more expansion busses 165, such as USB, IEEE 1394 bus, ATA, SATA, PCI, PCIE, DVI, HDMI and other busses, couple to bus 110 to facilitate the connection of peripherals and devices to IHS 100. A network interface adapter 170 couples to bus 110 to enable IHS 100 to connect by wire or wirelessly to a network and other information handling systems. In this embodiment, network interface adapter 170 may also be called a network communication adapter or a network adapter. While FIG. 1 shows one IHS that employs processor 105, the IHS may take many forms. For example, IHS 100 may take the form of a desktop, server, portable, laptop, notebook, or other form factor computer or data processing system. IHS 100 may take other form factors such as a gaming device, a personal digital assistant (PDA), a portable telephone device, a communication device or other devices that include a processor and memory.

IHS 100 employs an operating system (OS) 190 that may store on nonvolatile storage 145. IHS 100 includes an operating system computer program product on digital media 175 such as a CD, DVD or other media. In one embodiment, a designer or other entity configures the computer program product with node manager 180 software to practice the disclosed failure data node manager methodology. In practice, IHS 100 may store node manager 180 and OS 190 on nonvolatile storage 145 as node manager 180' and OS 190. When IHS 100 initializes, the IHS loads node manager 180' and OS 190 into system memory 125 for execution as node manager 180" and OS 190', respectively.

As will be appreciated by one skilled in the art, aspects of the disclosed node management methodology may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product, such as computer program product 175 embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the FIG. 4 and FIG. 5 flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowcharts of FIG. 4, FIG. 5, and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

Figure 4:
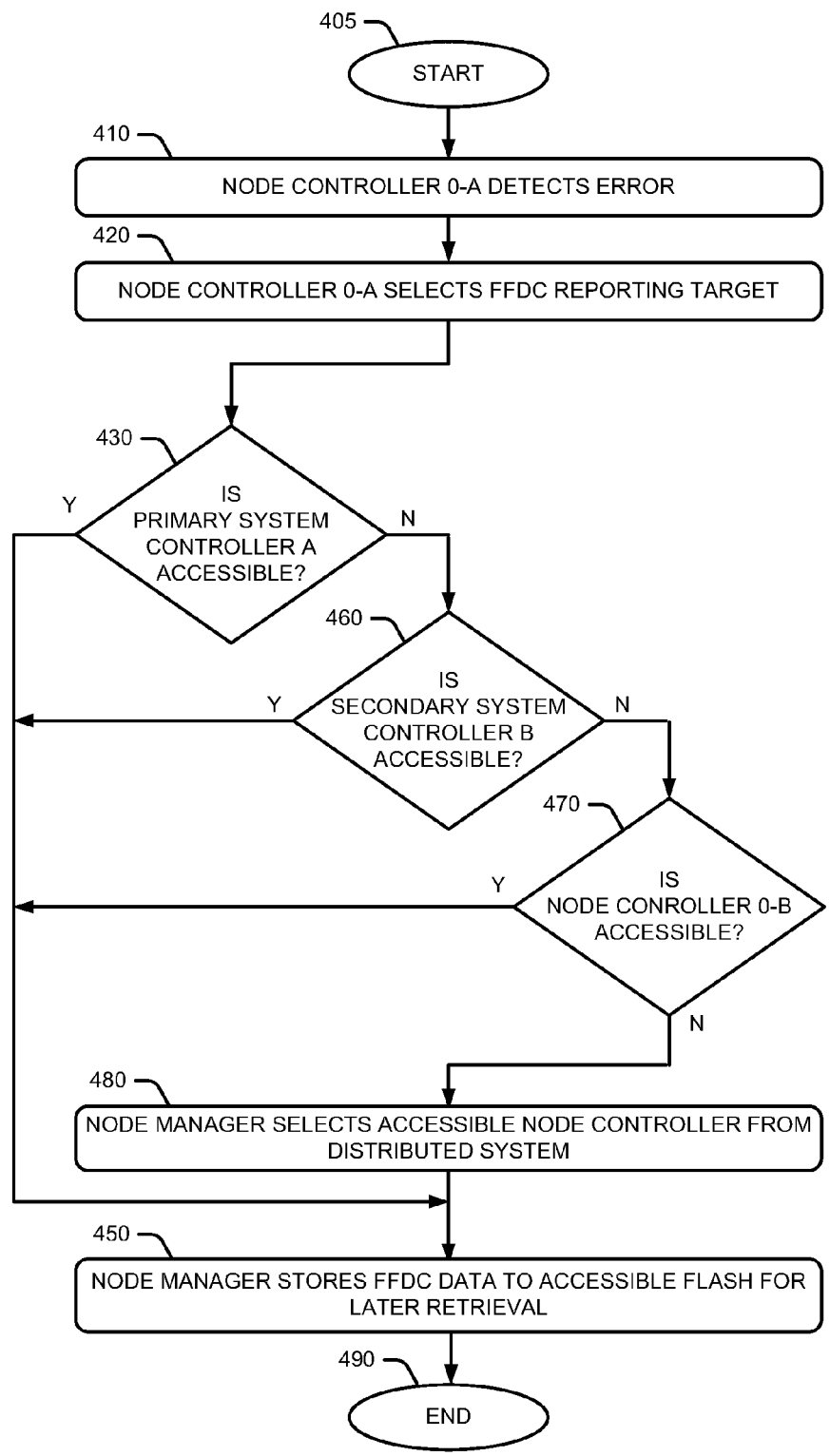
FIG. 4 is a flowchart of an embodiment of the disclosed failure data node manager methodology to store FFDC information.
Figure 5:
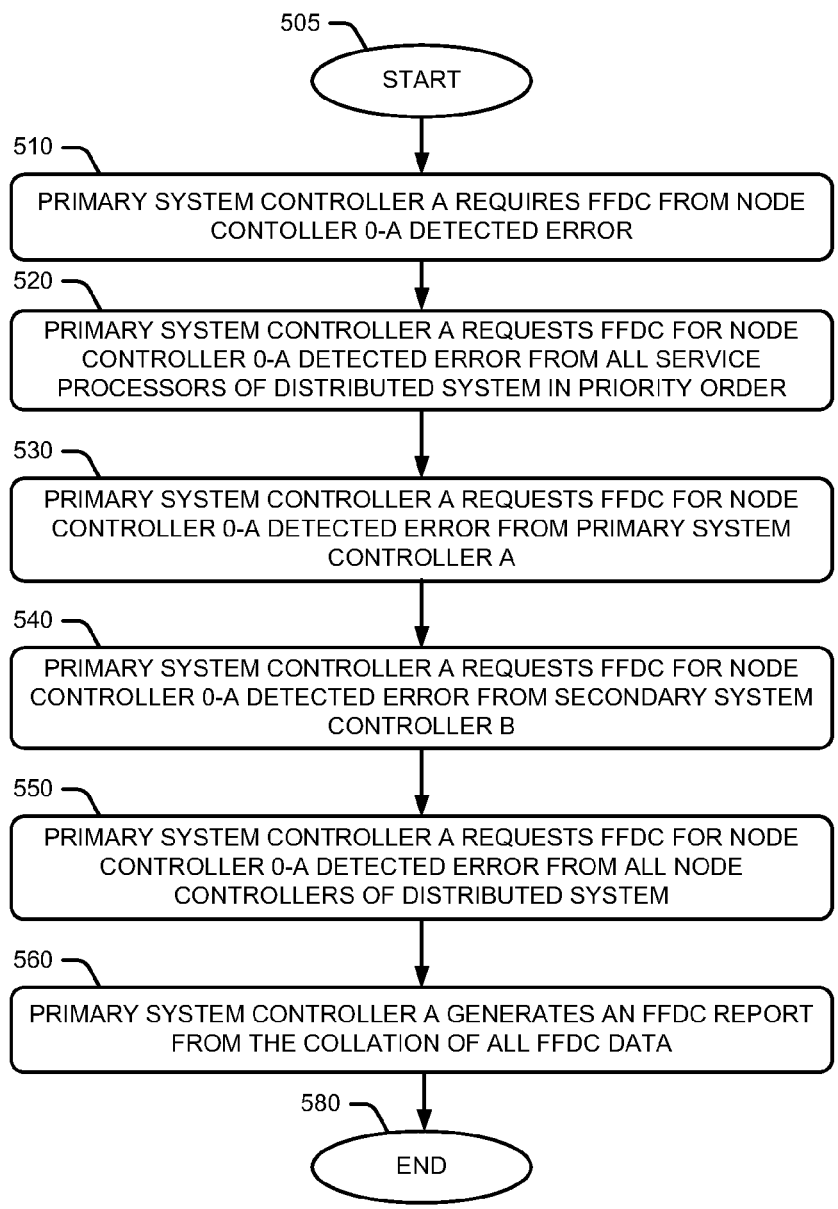
FIG. 5 is a flowchart of an embodiment of the disclosed failure data node manager methodology to retrieve FFDC information.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart of FIG. 4 or FIG. 5 described below.

Figure 2:
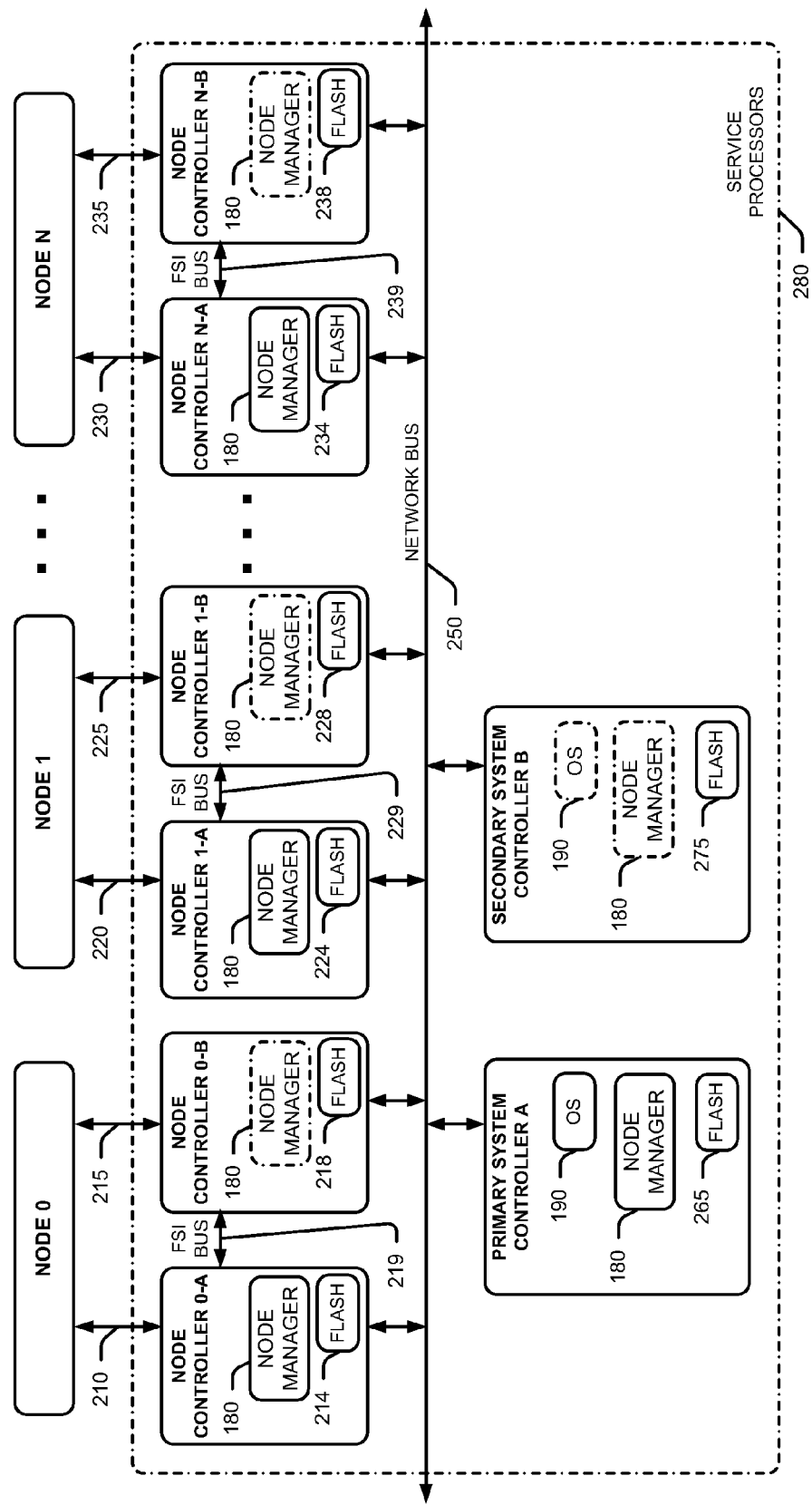
FIG. 2 is a block diagram of a distributed system that employs the disclosed failure data node manager methodology.

FIG. 2 is a block diagram representation of a distributed system 200 that a designer or other entity configures with node manager software according to the disclosed failure data node manager methodology. Distributed system 200 employs multiple nodes including a node 0, a node 1, ... a node N, wherein N is the total number of node IHSs in distributed system 200. Distributed system 200 may include multiple clients, servers, nodes, or other IHSs and devices not shown. A bus 210, such as an Ethernet or other bus couples node 0 to a node controller 0-A. A bus 215 couples node 0 to a node controller 0-B. A node controller, such as node controller 0-A controls the hardware and memory functionality of a node, such as node 0. For redundancy, distributed system 200 may employ multiple node controllers that control one node each. In this manner, distributed system 200 places a high priority on keeping the resources of node 0 operational even in the event of a node controller failure. Nodes 0, 1, ... N, and node controllers 0-A, 0-B, 1-A, 1-B ... N-A, N-B, and primary system controller A and secondary system controller B are all information handling systems (IHSs).

In one embodiment of the disclosed failure data node manager methodology, both node controller 0-A and node controller 0-B potentially provide control for node 0. The pair of node controllers, namely node controller 0-A and node controller 0-B, are node controller siblings, or more specifically sibling node controllers for node 0. Sibling node controllers couple to a common node to provide a redundant control capability for managing that node. In one embodiment of the disclosed failure data node manager methodology, node controller 0-A is the primary node controller for node 0 in the distributed system 200. In this embodiment, node controller 0-B is the secondary or backup node controller for node 0 in the distributed system 200. The respective primary and secondary designations for node controller 0-A and node controller 0-B are interchangeable under the control of distributed system 200 operating system software.

Node controller 0-A may be in control of hardware, memory, communication and other node 0 resources. If node controller 0-A fails, such as a process or other crash within node controller 0-A, node controller 0-B may exercise immediate control and management of node 0 operations. In this manner, node 0 may remain fully operational during the failure of a primary node controller, such as node controller 0-A. In the event of a failure of node controller 0-A, distributed system software may reverse designations of primary and secondary node controllers, thus making node controller 0-B the primary node controller and node controller 0-A the secondary or backup node controller. Distributed system software may then restart secondary node controller 0-A at a later time without interruption to node 0 operation.

A bus 220, such as an Ethernet or other bus couples node 1 to a node controller 1-A. A bus 225 couples node 1 to a node controller 1-B. In one embodiment of the disclosed failure data node manager methodology, node controller 1-A is the primary node controller for node 1 of distributed system 200. In this embodiment, node controller 1-B is the secondary or backup node controller for node 1. If node controller 1-A fails, such as a process or other crash within node controller 1-A, node controller 1-B may exercise control and management of node 1 operations. In this manner node 1 may remain fully operational during a failure of a primary node controller, such as that of node controller 1-A. Each of node controller 1-A and node controller 1-B may reverse designations of primary and secondary node controllers at any time, thus making node controller 1-B the primary node controller and node controller 1-A the secondary or backup node controller.

A bus 230, such as an Ethernet or other bus couples node N to a node controller N-A. A bus 235 couples node N to a node controller N-B, wherein N is the total number of node IHSs in distributed system 200. In one embodiment of the disclosed failure data node manager methodology, node controller N-A is the primary node controller for node N of distributed system 200. In this embodiment, node controller N-B is the secondary or backup node controller for node N of distributed system 200. If node controller N-A fails, such as a process or other crash within node controller N-A, node controller N-B may exercise control and management of node N operations. In this manner node N may remain fully operational during a failure of a primary node controller, such as that of node controller 1-A. Each of node controller 1-A and node controller 1-B may reverse designations of primary and secondary node controllers at any time, thus making node controller 1-B the primary node controller and node controller 1-A the secondary or backup node controller.

Busses 210, 215, 220, 225, 230, and 235 are Ethernet or other communication busses for communication between node 0, node 1, ... and node N to all node controllers of distributed system 200, namely node controller 0-A, node controller 0-B, node controller 1-A, node controller 1-B, node controller N-A, and node controller N-B. Node controller 0-A includes a node manager 180 that employs the disclosed failure data node manager methodology. Node controller 0-A includes a nonvolatile storages such as a flash memory 214 that node manager 180 employs to implement the disclosed failure data node manager methodology. For example, node controller 0-A may employ flash memory 214 as storage of first failure data capture (FFDC) information that node controller 0-A generates. As shown in more detail in FIG. 3 below, FFDC information 300 may provide useful node controller error information to resources of distributed system 200 in the event that node controller 0-A, or another node controller of distributed system 200 detects an error.

Node controller 0-B includes a node manager 180 that employs the disclosed failure data node manager methodology. Node controller 0-B includes a nonvolatile memory 218 such as flash memory that node manager 180 employs to implement the disclosed failure data node manager methodology. Node controller 0-B may employ flash memory 218 as storage of first failure data capture FFDC information 300. The FFDC information 300 may provide useful information to resources of distributed system 200 in the event that a node controller detects an error or resource failure within distributed system 200. Node controller 1-A includes node manager software 180 that employs the disclosed failure data node manager methodology. Node controller 1-A includes a nonvolatile memory 224 such as flash memory that node manager 180 employs to implement the disclosed failure data node manager methodology. Node controller 1-A may employ flash memory 224 to store the first failure data capture FFDC information 300. The FFDC information 300 may provide useful information to resources of distributed system 200 in the event that a node controller detects an error or resource failure within distributed system 200.

Node controller 1-B likewise includes a node manager 180 that employs the disclosed failure data node manager methodology. Node controller 1-B includes a nonvolatile memory 228 that node manager 180 employs to implement the disclosed failure data node manager methodology. Node controller 1-B may employ flash memory 228 to store the first failure data capture information FFDC 300. The FFDC information 300 may provide useful information to resources of distributed system 200 in the event that a node controller detects an error or resource failure within distributed system 200. Like the other node controllers described above, node controller N-A includes a node manager 180. Node controller N-A includes a nonvolatile storage 234 such as flash memory that node manager 180 employs to implement the disclosed failure data node manager methodology. Node controller N-A may employ flash memory 234 to store the first failure data capture FFDC information 300. The FFDC information 300 may provide useful information to resources of distributed system 200 in the event that a node controller detects an error or resource failure within distributed system 200.

Like the other node controllers in distributed system 200, node controller N-B includes a node manager 180 that employs the disclosed failure data node manager methodology. Node controller N-B includes a nonvolatile memory 238 such as flash memory that node manager 180 employs to implement the disclosed failure data node manager methodology. Node controller N-B may employ flash memory 238 to store the first failure data capture FFDC 300 information. The FFDC information 300 may provide useful information to resources of distributed system 200 in the event that a node controller detects an error or resource failure within distributed system 200. For purposes of this example, node controller 0-A employs node manager 180 that provides "store" operations for FFDC information 300. In this example, node controller 0-A is the primary node controller and node controller 0-B is the secondary node controller. This means that node manager 180 in node controller 0-A is currently actively managing node 0, as the solid line around node manager indicates. In contrast, FIG. 2 shows node manager 180 in node controller 0-B with a dashed line to indicate that node controller 0-B, namely the secondary node controller, is currently idle in terms of managing node 0.

Referring now to the other node controllers in distributed system 200, node controller 1-A employs node manager 180 that provides "store" operations for FFDC information 300 in a similar manner to node controller 0-A. In this example, node controller 1-A is the primary node controller and node controller 1-B is the secondary node controller for node 1. This means that node manager 180 in node controller 1-A is currently actively managing node 1, as the solid line around node manager 180 indicates. In contrast, node manager 180 in node controller 1-B uses a dashed line to indicate that node controller 1-B, namely the secondary node controller, is currently idle in terms of managing node 1. Node controller N-A is the primary node controller and node controller N-B is the secondary node controller for node N. This means that node manager 180 in node controller N-A is currently actively managing node N, as the solid line around node manager 180 indicates. In contrast, FIG. 2 shows node manager 180 in node controller N-B with a dashed line to indicate that node controller N-B, namely the secondary node controller, is currently idle in terms of managing node N. Other embodiments and combinations of node manager 180 active or inactive status are possible.

Node controllers may communicate with each other over field replaceable unit (FRU) or field support interface (FSI) busses internal to distributed system 200. An FSI bus 219 couples node controller 0-A to sibling node controller 0-B. An FSI bus 229 couples node controller 1-A and sibling node controller 1-B. An FSI bus 239 couples node controller N-A and sibling node controller N-B. FSI bus 219 provides for high-speed communications between sibling node controllers or node controller pairs, such as a primary node controller 0-A and a secondary or backup node controller 0-B. Primary and secondary node controllers partner with one another to provide redundancy control for a particular node. Distributed system software may reverse these primary and secondary node controller designations at any time. FSI bus 229 provides a high-speed communications path between node controller 1-A and sibling node controller 1-B. FSI bus 239 provides a high-speed communications path between node controller N-A and sibling node controller N-B.

A network bus 250 couples a primary system controller A and a secondary system controller B together and to each node controller of distributed system 200, namely node controller 0-A, node controller 0-B, node controller 1-A, node controller 1-B, . . . node controller N-A, and node controller N-B. In one embodiment, network bus 250 is an Ethernet bus that couples each node controller and system controller within distributed system 200. Primary system controller A includes a node manager 180 that employs the disclosed failure data node manager methodology. Primary system controller A includes a nonvolatile memory 265 such as flash memory that node manager 180 employs to implement the disclosed failure data node manager methodology. Primary system controller A includes operating system OS software 190. In one embodiment, OS 190 performs operations such as exchanging the primary and secondary service processor designations and functions, as well as other software functions of distributed system 200.

Secondary system controller B includes a node manager 180 that employs the disclosed failure data node manager methodology. Secondary system controller B includes OS 190. In one embodiment, FIG. 2 shows OS 190 in secondary controller B with a dashed line to indicate that secondary system controller B is currently idle in terms of providing operating system management of distributed system 200 resources. In contrast, OS 190 within primary system controller A is currently active in terms of providing operating system management of distributed system 200 resources as the solid line around OS 190 indicates.

Secondary system controller B includes a nonvolatile memory 275 such as flash memory that node manager 180 employs to implement the disclosed failure data node manager methodology. As shown by the solid line drawn around node manager 180 instead of a dashed line, node manager 180 of primary system controller A is active, and for purposes of this example implements the FFDC 300 "retrieve" operations as described in more detail below. However, as shown by a dashed line drawn around node manager 180 of system controller B, node manager 180 of secondary system controller B is not active in this embodiment.

In another embodiment of the disclosed methodology, the roles of primary system controller A and secondary system controller function B in reverse order. In other words, primary system controller A is the secondary system controller and secondary system controller B is the primary system controller. In this case, both OS 190 and node manager 180 within secondary system controller B would indicate an active state with a solid line. In contrast, both OS 190 and node manager 180 within primary system controller A would indicate an idle state with a dashed line. Other embodiments and combinations of primary system controller A and secondary system controller B active or inactive status are possible.

Distributed system 200 includes service processors 280 such as system controller IHSs and node controller IHSs for distributed system 200. Specifically, service processors 280 includes node controller 0-A, node controller 0-B, controller 1-A, node controller 1-B, . . . node controller N-A, node controller N-B, primary system controller A, and secondary system controller B IHSs. Network bus 250 provides a communication path between each service processor of distributed system 200. Network bus 220 may couple to external IHSs, such as other systems, servers, or nodes external to and not shown in distributed system 200.

In the event of error detection by a particular node controller within distributed system 200, the flash memory of each service processor provides a potential store for the error information related to that particular node controller error. For example, if node controller 0-A detects an error, node manager 180 of node controller 0-A may store error information in the form of FFDC 300 data pertinent to this failure in nonvolatile memories such as flash memory 214, flash memory 218, flash memory 224, flash memory 228, flash memory 234, flash memory 238, flash memory 265, flash memory 275 or other nonvolatile memory not shown, as described in more detail below.

In one embodiment, node controller 0-A detects an error that involves a communications loss between node controller 0-A and primary system controller A. For example, that error may be the event of an Ethernet loss, such as network bus 250 failure between node controller 0-A and primary system controller A. Even with a communication loss, resources of primary system controller A may desire error information, such as the FFDC information 300 that node controller 0-A may contain. In the event of a communication loss between the error detecting node controller and the primary system controller, node manager 180 within node controller 0-A, provides a systematic and prioritized process of FFDC information 300 storage and retrieval as described below.

Figure 3:
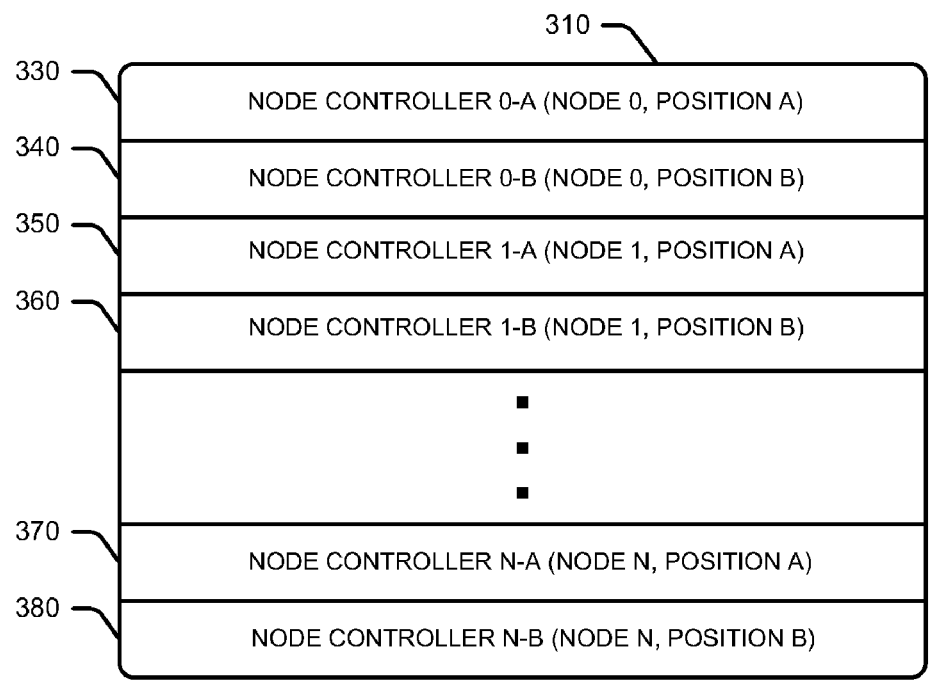
FIG. 3 shows a block diagram of a flash memory store including first failure data capture (FFDC) information that the disclosed failure data node manager methodology employs.

FIG. 3 is a representation of first failure data capture FFDC information 300 that a resource of distributed system 200 may store and retrieve according to the disclosed failure data node manager methodology. In one embodiment of the disclosed method, distributed system 200 stores FFDC information 300 in flash memory, such as the flash memories of service processors 280. For example, the node manager 180 that node controller 0-A employs may initiate a store of FFDC information 300 in one or more flash memories, namely flash memory 214, flash memory 218, flash memory 224, flash memory 228, flash memory 234, flash memory 238, flash memory 265, or flash memory 275. Each flash memory of distributed system 200 reserves a portion its memory for FFDC information 300 for each node controller of distributed system 200. Each flash memory, such as flash 214 that node controller 0-A employs, maintains a similar information grouping as shown in FIG. 3.

In one embodiment of the disclosed failure data node manager methodology, flash memory 214 stores and maintains a collection of FFDC information 300 from each node controller of distributed system 200. As shown in FIG. 3 column 310, flash memory, such as flash memory 214, maintains FFDC information 300 for each node controller, namely node controller 0-A, node controller 0-B, node controller 1-A, node controller 1-B, . . . node controller N-A, and node controller N-B. Row 330 depicts a store of FFDC information 300 from node controller 0-A within flash memory 214 of node controller 0-A. Row 340 depicts a store of FFDC 300 information from node controller 0-B within flash memory 214 of node controller 0-A. Row 350 depicts a store of FFDC 300 information from node controller 1-A within flash memory 214 of node controller 0-A. Row 360 depicts a store of FFDC information 300 from node controller 1-B within flash memory 214 of node controller 0-A. Row 370 depicts a store of FFDC information 300 from node controller N-A within flash memory 214 of node controller 0-A. Finally, row 380 depicts a store of FFDC information 300 from node controller N-B within flash memory 214 of node controller 0-A. Each flash memory, namely flash memory 218, flash memory 224, flash memory 228, flash memory 234, flash memory 238, flash memory 265, and flash memory 275, not within node controller 0-A of distributed system 200, maintains an identical memory structure to that of flash memory 214 described above. In this manner, distributed system 200 replicates node controller error information in multiple locations across the distributed system should retrieval of the error information become necessary in the event of node controller failure.

FFDC information 300 that each flash memory, such as flash memory 214, stores within each node controller, such as node controller 0-A, provides distributed system 200 resources, system administrators, and other entities with information regarding node controller error and failure information. For example, flash memory 214 may store the latest or first failure information, namely FFDC information 300 for each node controller of distributed system 200, namely node controller 0-A, node controller 0-B, node controller 1-A, node controller 1-B, . . . node controller N-A, and node controller N-B. In one embodiment, FFDC information 300 includes the last error information for a particular node controller error and thus the first error information useful in understanding the most recent failure. During an error analysis, the first error information or the latest error information has significant value to system administrators or other resources of distributed system 200 attempting to analyze or recover from a particular error or failure.

The flowcharts of FIGS. 4 and 5 illustrate the architecture, functionality, and operation of possible implementations of systems, methods and computer program products that perform node management in accordance with various embodiments of the present invention. In this regard, each block in the flowcharts of FIG. 4 and FIG. 5 may represent a module, segment, or portion of code, which comprises one or more executable instructions for implementing the specified logical function(s). It should also be noted that, in some alternative implementations, the functions noted in the block may occur out of the order noted in FIG. 4 or FIG. 5. For example, two blocks shown in succession may, in fact, be executed substantially concurrently, or the blocks may sometimes be executed in the reverse order, depending upon the functionality involved. It will also be noted that each block of FIG. 4 or FIG. 5 and combinations of blocks in the block diagrams and/or flowchart illustration, can be implemented by special purpose hardware-based systems that perform the specified functions or acts, or combinations of special purpose hardware and computer instructions.

FIG. 4 is a flowchart that shows process flow in an embodiment of the disclosed methodology that tests to determine if a particular node controller in a distributed system detects an error and then manages error information for that particular node controller. More specifically, the flowchart of FIG. 4 shows how the embedded distributed system node manager 180 of FIG. 1 manages FFDC information 300 for a particular node controller error detection. In one embodiment, distributed system 200 configures node controller 0-A as the primary node controller for node 0. For example, operating system software, such as OS 190 that primary system controller A employs, manages the primary and secondary functions for the node controller pair of node 0. OS 190 determines the primary and secondary function assignments for the node controller pair or node controller siblings of node 0, namely node controller 0-A and node controller 0-B.

Primary system controller A may also manage the primary and secondary function assignments for each pair of node controllers, such as node 1's node controller pair of node controller 1-A and node controller 1-B, . . . and node N's node controller pair of node controller N-A and node controller N-B. In this manner, node controller 0-B performs as a backup or as the secondary node controller for node 0. Node controller 1-B, . . . and node controller N-B perform as backup or as the secondary node controllers for node 1, . . . node N respectively. In one embodiment, distributed system 200, and more specifically primary system controller A, may reverse the designations of primary and secondary node controllers for the node 0 node controller pair, namely node controller 0-A and node controller 0-B, or other node controller pairs at any time.

Referring now to the details of FIG. 4, the disclosed first failure data capture (FFDC) 300 store to flash memory method starts, as per block 405. Node controller 0-A detects an error, as per block 410. Node controller 0-A is the primary node controller for node 0. One example of a node controller 0-A error detection is a loss of communication between node controller 0-A and primary system controller A. One cause of this error may be the unintentional disconnection of an Ethernet port between node controller 0-A and primary system controller A. Another example of a node controller 0-A error may be a process or application failure in node 0 and ultimate crash or lockup of node 0. Node controller 0-A errors may include any disruption in normal operation of node controller 0-A and/or communication with other devices of distributed system 200. An error that node controller 0-A detects may indicate that node controller 0-A and node 0 are not operating properly and error node controller 0-A initiates a store of FFDC information 300.

Node controller 0-A employs the particular node manager 180 therein to manage the FFDC 300 target selection process, namely the targeting of a particular flash memory within distributed system 200 for FFDC information 300 storage. Node controller 0-A selects the FFDC 300 reporting target, as per block 420. Decision block 430 represents the start of this reporting target selection process and testing. If the test, as shown per block 430 determines that primary system controller A is accessible, then node manager 180 of node controller 0-A stores FFDC information 300 in the accessible flash memory of primary system controller A for later retrieval, as per block 450. In this case, node manager 180 initiates the store of FFDC 300 data to the accessible flash, namely flash memory 265 in primary system controller A. In an alternative embodiment, in addition to storing the FFDC information 300 in the flash memory 265 of primary system controller A, node manager 180 of node controller 0-A may also store the FFDC information in the flash memories of other accessible node controllers and system controllers in the distributed system 200.

If the primary system controller A is not accessible during the test of decision block 430, node manager 180 of node controller 0-A performs a test to determine if secondary system controller B is accessible, as per block 460. If the test of block 460 determines that secondary system controller B is accessible, then node manager 180 of node controller 0-A stores FFDC information 300 to accessible flash memory for later retrieval, as per block 450. In this case, node manager 180 initiates the store of FFDC information 300 in the accessible flash memory, namely the flash memory 275 that the secondary system controller B employs. In an alternative embodiment, in addition to storing the FFDC information 300 in the flash memory 275 of primary system controller B, node manager 180 of node controller 0-A may also store the FFDC information in the flash memories of other accessible node controllers in the distributed system 200.

If secondary system controller B is not accessible during the test of decision block 460, node manager 180 of node controller 0-A performs a test to determine if sibling node controller 0-B is accessible, as per block 470. If the test of block 470 determines that secondary node controller 0-B is accessible, then node manager 180 of node controller 0-A stores FFDC information 300 in accessible flash memory for later retrieval, as per block 450. In this case, node manager 180 initiates the store of FFDC information 300 to the accessible flash memory, namely the flash memory 218 that secondary node controller 0-B employs. In an alternative embodiment, in addition to storing the FFDC information 300 in the flash memory 218 of node controller 0-B, node manager 180 of node controller 0-A may also store the FFDC information in the flash memories of other accessible node controllers in the distributed system 200.

If primary system controller A, secondary system controller B, or secondary node controller 0-B are not accessible, then node manager 180 of node controller 0-A selects another accessible node controller from distributed system 200, as per block 480. For example, node manager 180 of node controller 0-A may select node controller 1-A, node controller 1-B, node controller N-A, node controller N-B or any other node controller (not shown) in distributed system 200 as the accessible target for storage of FFDC information 300. In this manner, node manager 180 provides a prioritization of reporting targets in precedence of most effective or desirable to least effective or desirable for FFDC information 300 storage. In one embodiment, the most effective storage for node controller FFDC information 300 is primary system controller A and the least effective storage is any node controller of distributed system 200 other than node controller 0-B. Node manager 180 stores FFDC information 300 to accessible flash for later retrieval in that particular flash as selected by the disclosed methodology, as per block 450. The FFDC 300 store to flash method ends, as per block 490.

After storing FFDC error information 300 into a flash memory of distributed system 200, primary system controller A or other service processors 280 of distributed system 200 may initiate recovery operations and other functions not detailed in the disclosed failure data node methodology. Once node manager 180 of node controller 0-A completes the storage of FFDC information 300 store in flash memory, system administrators or other entities and resources of distributed system 200 may require the use or analysis of the FFDC 300 information. In one embodiment, node manager 180 software that executes within primary system controller A initiates an FFDC information 300 retrieval process consistent with the disclosed failure data node methodology, As seen from the above discussion, node manager 180 of node controller 0-A establishes a priority order for FFDC error information 300 storage. This storage process works in a priority order, namely primary system controller A first, secondary system controller B second, node controller 0-B third, and finally other node controllers of distributed system 200. Table 1 below summarizes this priority order of node controller error information storage throughout distributed system 200.

TABLE 1

| PRIORITY ORDER | STORAGE TARGET MEMORY LOCATION FOR NODE CONTROLLER ERROR INFORMATION (FFDC INFORMATION) |
| --- | --- |
| 1 | PRIMARY SYSTEM CONTROLLER A |
| 2 | SECONDARY SYSTEM CONTROLLER B |
| 3 | SIBLING NODE CONTROLLER |
| 4 | ANY OTHER NODE CONTROLLERS (i.e. NON-SIBLING NODE CONTROLLERS) |

Other embodiments may employ different priority orders for node controller error information storage depending on the particular application.

FIG. 5 is a flowchart that shows process flow in an embodiment of the disclosed methodology that manages the retrieval of first failure data capture (FFDC) information 300 from flash memory of distributed system 200. The disclosed FFDC 300 retrieval method starts, as per block 505. Primary system controller A requires FFDC information 300 from a node controller 0-A detected error, as per block 510. A node controller 0-A detected error may occur from many causes as described above. In one embodiment, a communication loss between node controller 0-A and node 0 results in a node controller 0-A error detection. Many other examples, not shown, are possible with respect to generating a node controller 0-A error. Distributed system software, such as OS 190 of system controller A, may initiate error correction and other operations in response to the node 0-A error detection event.

Primary system controller A sends requests for FFDC information 300 for a node controller 0-A detected error from all service processors 280 of distributed system 200 in priority order, as per block 520. Node manager 180 of primary system controller A establishes a priority order of FFDC 300 storage, as per the method of FIG. 4 above. The retrieval process works in the same priority order that the method of FIG. 4 establishes, namely primary system controller A first, secondary system controller B second, node controller 0-B third, and finally other node controllers of distributed system 200.

Blocks 530, 540 and 550 detail the specific requests for FFDC information 300 that block 520 cumulatively describes. More particularly, primary system controller A requests FFDC information 300 for the node controller 0-A detected error from primary system controller A, as per block 530. Primary system controller A maintains FFDC 300 information within its own flash memory 265. Flash memory 265 includes error information for the node controller 0-A detected error as shown in row 330 of FIG. 3 above.

Primary system controller A may then next request FFDC information 300 for the node controller 0-A detected error from secondary system controller B, as per block 540. Although system controller A may contain FFDC information 300 for the node controller 0-A detected error, it is possible that system controller B may also contain useful FFDC information 300 regarding the node controller 0-A detected error. FFDC information 300 may provide useful information in understanding the node controller 0-A detected error causes and related events.

System administrators and other entities or resources of distributed system 200 may benefit from the analysis of FFDC 300 information. Primary system controller A requests FFDC information for the node controller 0-A detected error from all other node controllers of distributed system 200, as per block 550. For example, sibling node controller 0-B, may contain useful information regarding the node controller 0-A detected error in its flash memory 218. Other non-sibling node controllers of distributed system 200, such as node controller 1-A, node controller 1-B, ... node controller N-A, node controller N-B, and other node controllers not shown may contain useful FFDC information 300 as well as primary system controller A, secondary system controller B, and node controller 0-B.

Primary system controller A generates an FFDC report from the collation of all FFDC information 300, as per block 560. System administrators or other entities may employ the collection or collation of FFDC information 300 from each of the service processors 280 of distributed system 200 relating to a particular node controller failure, such as that of node controller 0-A. In one embodiment of the disclosed failure data node manager methodology, FFDC information 300 includes a timestamp that identifies the timing of that particular FFDC information 300. For example, referring to the FFDC information memory storage layout shown in FIG. 3, each entry or storage position may include a respective timestamp (not shown). Primary system controller A may use the timestamp as well as other unique information in each FFDC entry that node manager 180 stores in each flash memory of distributed system 200.

Each flash memory of service processors 280 may include FFDC information 300 that further includes a timestamp or time sequence of error data that node controller 0-A detects as an error. Primary system controller A may collate all FFDC 300 information taking into account time of error and other useful information. In this manner, system administrators or other entities may perform modifications to software, firmware, hardware or other features of distributed system 200 that may improve future performance characteristics of distributed system 200. The FFDC 300 retrieval from flash method ends, as per block 580.

As will be appreciated by one skilled in the art, aspects of the disclosed memory management technology may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method of error handling, comprising:
   providing a plurality of node information handling systems (IHSs) in a distributed system, each of the node IHSs having a plurality of node controller IHSs coupled thereto to provide control redundancy, a plurality of system controller IHSs being coupled to the plurality of node controller IHSs via a network bus;
   detecting, by a particular node controller IHS of the plurality of node controller IHSs, an error of the particular node controller IHS, thus providing a detected node controller error; and
   attempting storing, by the particular node controller IHS, error information relating to the detected node controller error in respective nonvolatile memory stores in the system controller IHSs and node controller IHSs according to a first priority order.

2. The method of claim 1, wherein a node manager in the particular node controller IHS controls the storing of error information according to the first priority order.

3. The method of claim 2, wherein according to the first priority order in the storing step, the node manager of the particular node controller attempts to store the error information first in a primary system controller IHS, second in a secondary system controller IHS, third in a sibling node controller IHS and fourth in a non-sibling node controller IHS.

4. The method of claim 1, wherein the error information comprises first failure data capture (FFDC) information for the particular node controller IHS.

5. The method of claim 1, further comprising retrieving, by a system controller of the plurality of system controllers, error information from the nonvolatile memory stores of the node controllers and the system controllers.

6. The method of claim 5, wherein the retrieving is performed according to a second priority order.

7. The method of claim 6, wherein the second priority order is the same as the first priority order.

8. A distributed system, comprising:
   a plurality of node information handling systems (IHSs), each of the node IHSs having a respective plurality of node controller IHSs coupled thereto to provide control redundancy, each node controller IHS including a respective nonvolatile memory store; and
   a plurality of system controller IHSs coupled to the node controller IHSs via a network bus, each system controller IHS including a respective nonvolatile memory store;
   wherein a particular node controller IHS is configured to detect an error of the particular node controller IHS, thus providing a detected node controller error, and wherein the particular node controller IHS is further configured to attempt to store error information relating to the detected node controller error in the respective nonvolatile memory stores in the system controller IHSs and node controller IHSs according to a first priority order.

9. The distributed system of claim 8, wherein the particular node controller IHS includes a node manager to control the storing of error information according to the first priority order.

10. The distributed system of claim 9, wherein according to the first priority order the node manager attempts to store the error information first in a primary system controller IHS, second in a secondary system controller IHS, third in a sibling node controller IHS and fourth in a non-sibling node controller IHS.

11. The distributed system of claim 8, wherein the error information comprises first failure data capture (FFDC) information for the particular node controller IHS.

12. The distributed system of claim 8, wherein a system controller retrieves error information from the nonvolatile memory stores of the node controllers and the system controllers.

13. The distributed system of claim 12, wherein system controller retrieves error information according to a second priority order.

14. The distributed system of claim 12, wherein the second priority order is the same as the first priority order.

15. A computer program product, comprising:
   a non-transitory computer readable storage medium for use on a distributed system that includes a plurality of node information handling systems (IHSs), each of the node IHSs having a respective plurality of node controller IHSs coupled thereto to provide control redundancy, each node controller IHS including a respective nonvolatile memory store, and a plurality of system controller IHSs coupled to the node controller IHSs via a network bus, each system controller IHS including a respective nonvolatile memory store;
   first node manager instructions that instruct a particular node controller IHS of the plurality of node controllers to detect an error of the particular node controller IHS, thus providing a detected node controller error; and
   second node manager instructions that instruct the particular node controller IHS to attempt to store error information relating to the detected node controller error in respective nonvolatile memory stores in the system controller IHSs and node controller IHSs according to a first priority order;
   wherein the first and second node manager instructions are stored on the computer readable storage medium.

16. The computer program product of claim 15, wherein according to the first priority order the second node manager instructions instruct the particular node controller IHS to attempt to store the error information first in a primary system controller IHS, second in a secondary system controller IHS, third in a sibling node controller IHS and fourth in a non-sibling node controller IHS.

17. The computer program product of claim 15, wherein the error information comprises first failure data capture (FFDC) information for the particular node controller IHS.

18. The computer program product of claim 15, further comprising third instructions that retrieve, by a system controller of the plurality of system controllers, error information from the nonvolatile memory stores of the node controllers and the system controllers.

19. The computer program product of claim 18, wherein the retrieving is performed according to a second priority order.

20. The computer program product of claim 19, wherein the second priority order is the same as the first priority order.

* * * * *